(12) United States Patent
Konishi et al.

(10) Patent No.: US 12,487,330 B2
(45) Date of Patent: Dec. 2, 2025

(54) DIVISION LINE RECOGNITION APPARATUS

(71) Applicant: Honda Motor Co., Ltd., Tokyo (JP)

(72) Inventors: Shunsuke Konishi, Wako (JP); Ryota Okutsu, Tokyo (JP)

(73) Assignee: Honda Motor Co., Latd., Tokyo (JP)

( * ) Notice: Subject to any disclaimer, the term of this patent is extended or adjusted under 35 U.S.C. 154(b) by 189 days.

(21) Appl. No.: 18/232,214

(22) Filed: Aug. 9, 2023

(65) Prior Publication Data

US 2024/0077585 A1  Mar. 7, 2024

(30) Foreign Application Priority Data

Sep. 2, 2022 (JP) ................................ 2022-140010

(51) Int. Cl.
| | |
|---|---|
| *G01S 7/48* | (2006.01) |
| *B60W 60/00* | (2020.01) |
| *G01C 21/00* | (2006.01) |
| *G01S 17/89* | (2020.01) |
| *G08G 1/16* | (2006.01) |

(52) U.S. Cl.
CPC ......... *G01S 7/4802* (2013.01); *B60W 60/001* (2020.02); *G01C 21/3815* (2020.08); *G01S 17/89* (2013.01); *G08G 1/167* (2013.01); *B60W 2420/408* (2024.01); *B60W 2520/06* (2013.01); *B60W 2520/10* (2013.01); *B60W 2552/53* (2020.02)

(58) Field of Classification Search
CPC ........................... G01S 7/4802; B60W 60/001
See application file for complete search history.

(56) References Cited

U.S. PATENT DOCUMENTS

| | | | | |
|---|---|---|---|---|
| 11,988,738 | B2* | 5/2024 | Hwang | G01S 17/931 |
| 2013/0342822 | A1* | 12/2013 | Shiraishi | G01S 7/4817 |
| | | | | 356/4.01 |
| 2018/0364333 | A1* | 12/2018 | Jungwirth | G01S 7/4817 |
| 2019/0033082 | A1* | 1/2019 | Asai | G05D 1/0274 |
| 2019/0383911 | A1* | 12/2019 | Zhang | G02B 26/101 |
| 2019/0391244 | A1* | 12/2019 | Sekiguchi | G01S 17/48 |
| 2020/0072948 | A1* | 3/2020 | Nguyen | G01S 17/931 |

(Continued)

FOREIGN PATENT DOCUMENTS

| | | |
|---|---|---|
| JP | 2006329971 A | 12/2006 |
| JP | 2020149079 A | 9/2020 |

(Continued)

*Primary Examiner* — Jess Whittington
(74) *Attorney, Agent, or Firm* — Duft & Bornsen, PC

(57) ABSTRACT

A division line recognition apparatus including: a microprocessor and a memory coupled to the microprocessor; and an in-vehicle detection unit irradiating a surrounding of a subject vehicle with an electromagnetic wave to detect an exterior environment situation in the surrounding. The microprocessor is configured to perform recognizing information indicating a division line in a first area separated from the subject vehicle on a road by a predetermined distance based on information detected by the in-vehicle detection unit at different positions on the road while the subject vehicle is traveling on the road; and mapping the information indicating the division line recognized in the recognizing, based on a traveling direction and a driving speed of the subject vehicle.

13 Claims, 9 Drawing Sheets

(56) References Cited

U.S. PATENT DOCUMENTS

| | | | |
|---|---|---|---|
| 2021/0208281 A1* | 7/2021 | Trofymov | G06V 20/56 |
| 2022/0327666 A1* | 10/2022 | Ollila | H04N 25/61 |
| 2022/0400598 A1* | 12/2022 | Tamatani | A01B 63/008 |
| 2023/0028159 A1* | 1/2023 | Yang | G02B 27/0955 |
| 2023/0202540 A1* | 6/2023 | Ono | G01S 5/00 246/120 |
| 2023/0341526 A1* | 10/2023 | Pulikkaseril | G02B 27/126 |

FOREIGN PATENT DOCUMENTS

| | | |
|---|---|---|
| WO | 2012117542 A1 | 9/2012 |
| WO | 2017037753 A1 | 3/2017 |
| WO | 2021141981 A1 | 7/2021 |

* cited by examiner

DIVISION LINE RECOGNITION APPARATUS

CROSS-REFERENCE TO RELATED APPLICATION

This application is based upon and claims the benefit of priority from Japanese Patent Application No. 2022-140010 filed on Sep. 2, 2022, the content of which is incorporated herein by reference.

BACKGROUND OF THE INVENTION

Field of the Invention

The present invention relates to a division line recognition apparatus that recognizes a division line of a road on which a vehicle travels.

Description of the Related Art

As a device of this type, there is a known device for changing irradiation angles of laser light irradiated from a LiDAR respectively with a first axis parallel to a height direction and a second axis parallel to a horizontal direction as the center, scanning them, and detecting a curbstone on a road end, based on position information of each detection point (for example, see JP 2020-149079 A).

In the above device, many detection points are acquired by scanning, and a processing load for acquiring the position information based on each detection point is large.

SUMMARY OF THE INVENTION

An aspect of the present invention is a division line recognition apparatus including: a microprocessor and a memory coupled to the microprocessor; and an in-vehicle detection unit irradiating a surrounding of a subject vehicle with an electromagnetic wave to detect an exterior environment situation in the surrounding. The microprocessor is configured to perform recognizing information indicating a division line in a first area separated from the subject vehicle on a road by a predetermined distance based on information detected by the in-vehicle detection unit at different positions on the road while the subject vehicle is traveling on the road; and mapping the information indicating the division line recognized in the recognizing, based on a traveling direction and a driving speed of the subject vehicle.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, embodiments of the invention will be described with reference to the drawings.

A division line recognition apparatus according to an embodiment of the present invention is applicable to a vehicle having a self-driving capability, that is, a self-driving vehicle. Note that a vehicle to which the division line recognition apparatus according to the present embodiment is applied will be referred to as a subject vehicle to be distinguished from other vehicles, in some cases. The subject vehicle may be any of an engine vehicle including an internal combustion engine (engine) as a driving power source, an electric vehicle including a driving motor as the driving power source, and a hybrid vehicle including an engine and a driving motor as the driving power sources. The subject vehicle is capable of traveling not only in a self-drive mode that does not necessitate the driver's driving operation but also in a manual drive mode of the driver's driving operation.

While a self-driving vehicle is moving in the self-drive mode (hereinafter, referred to as self-driving or autonomous driving), such a self-driving vehicle recognizes an exterior environment situation in the surroundings of the subject vehicle, based on detection data of an in-vehicle detection unit such as a camera or a light detection and ranging (LiDAR). The self-driving vehicle generates a driving path (a target path) from a current point of time to a predetermined time ahead, based on recognition results, and controls an actuator for driving so that the subject vehicle travels along the target path.

Figure 1A:
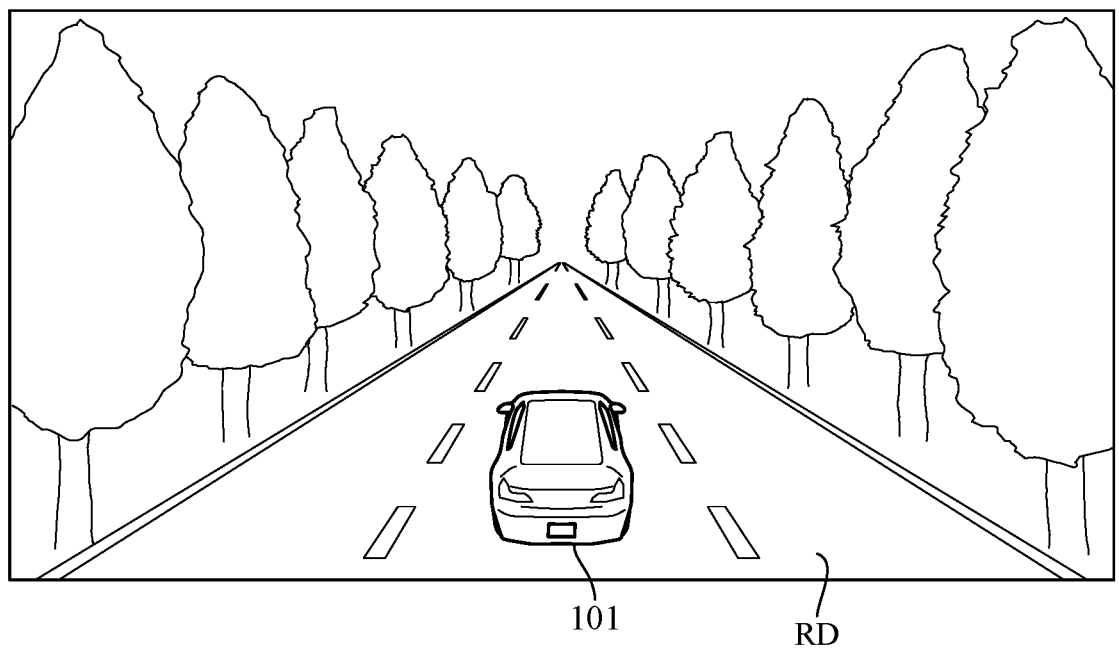
FIG. 1A is a diagram illustrating how a vehicle travels on a road.
Figure 1B:
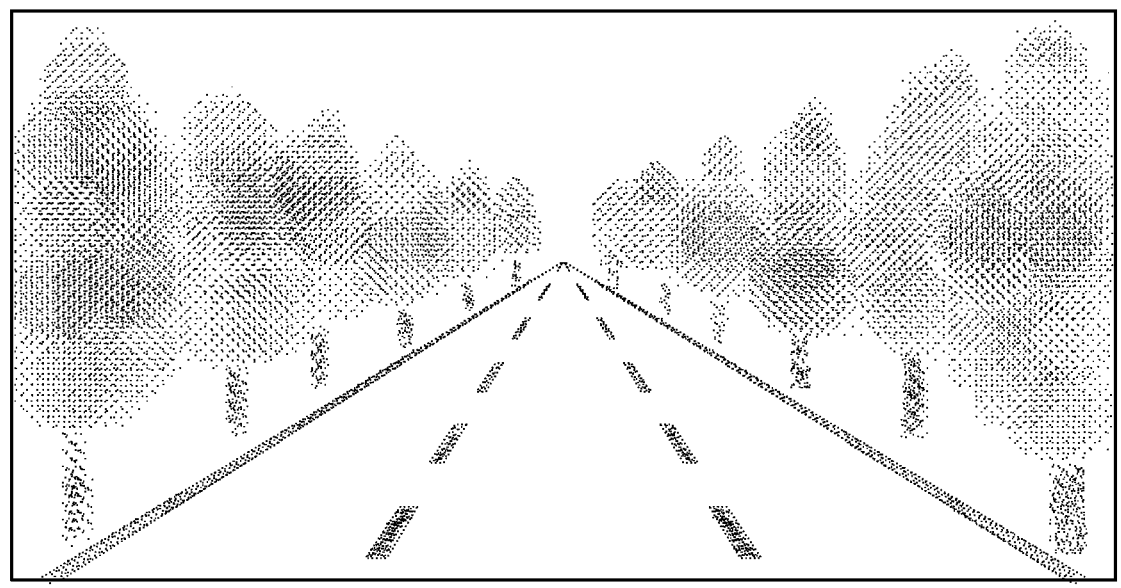
FIG. 1B is a diagram illustrating an example of point cloud data of FIG. 1A.

FIG. 1A is a diagram illustrating how a subject vehicle 101, which is a self-driving vehicle, travels on a road RD. FIG. 1B is a diagram illustrating an example of detection data (measurement points) that has been obtained by a LiDAR mounted on the subject vehicle 101. The measurement point by the LiDAR denotes point information of the irradiated laser that has been reflected by a certain point on a surface of an object and then returned. Specific examples of the point information include a distance from a laser source to a point, the intensity of the laser that has been reflected and returned, and a relative speed of an object located at a point. In addition, data including a plurality of measurement points as illustrated in FIG. 1B will be referred to as point cloud data. FIG. 1B illustrates point cloud data corresponding to a location point of FIG. 1A. The subject vehicle 101 recognizes an exterior environment situation in the surroundings of the subject vehicle, more specifically, a road structure, an object, and the like (including a division line), based on the point cloud data as illustrated in FIG. 1B, and generates a target path, based on the recognition results.

As a method for sufficiently recognizing the exterior environment situation in the surroundings of the vehicle, by the way, it is conceivable to increase the number of irradiation points of electromagnetic waves irradiated from the in-vehicle detection unit such as a LiDAR (in other words, to increase irradiation point density of the electromagnetic waves so as to increase the density of the point cloud data). On the other hand, in a case where the number of irradiation points is increased, a processing load for controlling the in-vehicle detection unit increases, or a capacity of the detection data (the point cloud data) obtained by the in-vehicle detection unit increases, and a processing load for the point cloud data is likely to increase. In particular, as illustrated in FIG. 1B, in a situation in which lots of objects (in addition to trees, people, buildings, and the like) are present on roadsides, the capacity of the point cloud data further increases. In addition, in order to deal with such a problem, the scale of the device is likely to increase, such as an increase in the number of lasers. Hence, in consideration of these circumstances, in the embodiments, the division line recognition apparatus is configured as follows.

<Overview>

The division line recognition apparatus according to an embodiment intermittently irradiates with irradiation light (one type of electromagnetic waves) in a traveling direction of the subject vehicle 101 from a LiDAR 5 of the subject vehicle 101, which travels on a road RD, and acquires point cloud data at different positions on the road RD in a discrete manner. The irradiation range of the irradiation light irradiated from the LiDAR 5 is formed in a band shape that is long in a road width direction that intersects the traveling direction so that the point cloud data acquired by the LiDAR 5, based on irradiation light at a previous time, and the point cloud data acquired by the LiDAR 5, based on irradiation light at a current time, are connected with each other seamlessly in the traveling direction of the road RD.

More specifically, a band-shaped first area that is long in the road width direction described above is set as an irradiation range at a position on the road RD to be apart from the subject vehicle 101 by a predetermined distance (corresponding to a depth distance to be described later) based on the vehicle speed (driving speed) of the subject vehicle 101, and in addition, a predetermined irradiation point density is set for the first area. Then, by setting the irradiation point density of another area other than the first area to be lower than the irradiation point density of the first area, or stopping irradiating another area, the total number of the irradiation points to be irradiated from the LiDAR 5 is suppressed. That is, it becomes possible to reduce the number of the irradiation points of the LiDAR without degrading the recognition accuracy of the position (the distance from the subject vehicle 101) or the size of an object or the like (including a division line) to be recognized based on the point cloud data.

Such a division line recognition apparatus will be described in more detail.

<Configuration of Vehicle Control Device>

Figure 2:
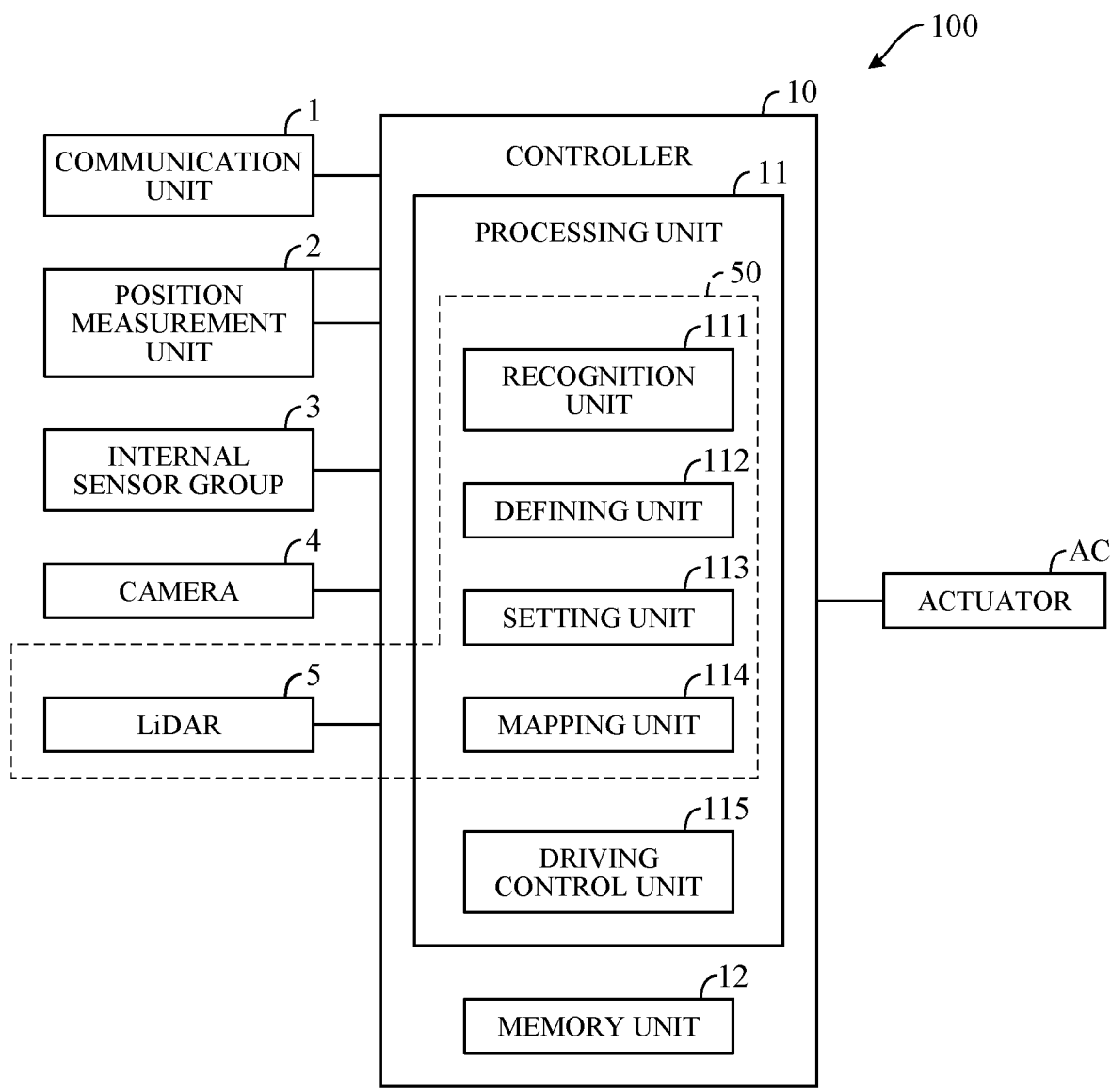
FIG. 2 is a block diagram illustrating a configuration of main components of a vehicle control device.

FIG. 2 is a block diagram illustrating a configuration of main components of a vehicle control device 100 including the division line recognition apparatus. The vehicle control device 100 includes a controller 10, a communication unit 1, a position measurement unit 2, an internal sensor group 3, a camera 4, a LiDAR 5, and a traveling actuator (simply referred to as actuator) AC for driving. The communication unit 1, the position measurement unit 2, the internal sensor group 3, the camera 4, the LiDAR 5, and the actuator AC are communicably connected with the controller 10 through a CAN communication line or the like. In addition, the vehicle control device 100 includes an exterior environment recognition apparatus 50, which serves as the division line recognition apparatus, constituting a part of the vehicle control device 100. The exterior environment recognition apparatus 50 recognizes an exterior environment situation (including a division line) in the surroundings of the vehicle, based on detection data of an in-vehicle detection unit such as the camera 4 or the LiDAR 5.

The communication unit 1 communicates with various servers, not illustrated, through a network including a wireless communication network represented by the Internet network, a mobile telephone network, or the like, and acquires map information, driving history information, traffic information, and the like from the servers periodically or at a given timing. The network includes not only a public wireless communication network but also a closed communication network provided for every predetermined management area, for example, a wireless LAN, Wi-Fi (registered trademark), Bluetooth (registered trademark), and the like. The acquired map information is output to a memory unit 12, and the map information is updated. The position measurement unit (GNSS unit) 2 includes a positioning sensor for receiving a positioning signal transmitted from a positioning satellite. The positioning satellite is an artificial satellite such as a GPS satellite or a quasi-zenith satellite. By using the positioning information that has been received by the positioning sensor, the position measurement unit 2 measures a current position (latitude, longitude, and altitude) of the subject vehicle 101.

The internal sensor group 3 is a general term of a plurality of sensors (internal sensors) for detecting a driving state of the subject vehicle 101. For example, the internal sensor group 3 includes a vehicle speed sensor that detects the vehicle speed of the subject vehicle 101, an acceleration sensor that detects the acceleration in a front-rear direction and the acceleration (lateral acceleration) in a left-right direction of the subject vehicle 101, a rotation speed sensor that detects the rotation speed of the driving power source, a yaw rate sensor that detects the rotation angular speed around the vertical axis of the center of gravity of the subject vehicle 101, and the like. The internal sensor group 3 also includes sensors that detect a driver's driving operation in the manual drive mode, for example, an operation on an accelerator pedal, an operation on a brake pedal, an operation on a steering wheel, and the like.

The camera 4 includes an imaging element such as a CCD or a CMOS, and captures an image of the surroundings of the subject vehicle 101 (forward, rearward, and lateral sides). The LiDAR 5 receives scattered light with respect to irradiation light in all directions of the subject vehicle 101, and measures a distance from the subject vehicle 101 to an object in the surroundings, a position and shape of the object, and the like.

The actuator AC is an actuator for driving in order to control driving of the subject vehicle 101. In a case where the driving power source is an engine, the actuator AC includes an actuator for throttle to adjust an opening (a throttle opening) of a throttle valve of the engine. In a case where the driving power source is a driving motor, the driving motor is included in the actuator AC. The actuator AC also includes a brake actuator that actuates a braking device of the subject vehicle 101, and a steering actuator that drives a steering device.

The controller 10 includes an electronic control unit (ECU). More specifically, the controller 10 includes a computer including a processing unit 11 such as a CPU (a microprocessor), the memory unit 12 such as a ROM and a RAM, and other peripheral circuits, not illustrated, such as an I/O interface. Note that a plurality of ECUs having different functions such as an ECU for engine control, an ECU for driving motor control, and an ECU for braking device can be individually provided. However, in FIG. 2, the controller 10 is illustrated as aggregation of these ECUs, for the sake of convenience.

The memory unit 12 stores highly precise detailed map information (referred to as high-precision map information). The high-precision map information includes position information of roads, information of road shapes (curvature or the like), information of road gradients, position information of intersections or branch points, information of the number of traffic lanes (driving lanes), traffic lane widths and position information for every traffic lane (information of center positions of traffic lanes or boundary lines of traffic lane positions), position information of landmarks (traffic lights, traffic signs, buildings, and the like) as marks on a map, and information of road surface profiles such as unevenness of road surfaces. In addition to two-dimensional map information to be described later, the memory unit 12 also stores programs for various types of control, information of thresholds for use in programs, and setting information (irradiation point information to be described later, and the like) for the in-vehicle detection unit such as the LiDAR 5.

The processing unit 11 includes a recognition unit 111, a defining unit 112, a setting unit 113, a mapping unit 114, and a driving control unit 115, as functional configurations. Note that as illustrated in FIG. 2, the recognition unit 111, the defining unit 112, the setting unit 113, and the mapping unit 114 are included in the exterior environment recognition apparatus 50, which serves as the division line recognition apparatus. As described above, the exterior environment recognition apparatus 50 recognizes an exterior environment situation (including a division line) in the surroundings of the vehicle, based on the detection data of the in-vehicle detection unit such as the camera 4 or the LiDAR 5. Details of the recognition unit 111, the defining unit 112, the setting unit 113, and the mapping unit 114 included in the exterior environment recognition apparatus 50 will be described later.

In the self-drive mode, the driving control unit 115 generates a target path, based on the exterior environment situation in the surroundings of the vehicle that has been recognized by the exterior environment recognition apparatus 50, and controls the actuator AC so that the subject vehicle 101 travels along the target path. Note that in the manual drive mode, the driving control unit 115 controls the actuator AC in accordance with a driving command (a steering operation or the like) from the driver that has been acquired by the internal sensor group 3.

<Detection Area by LiDAR>

Figure 3A:
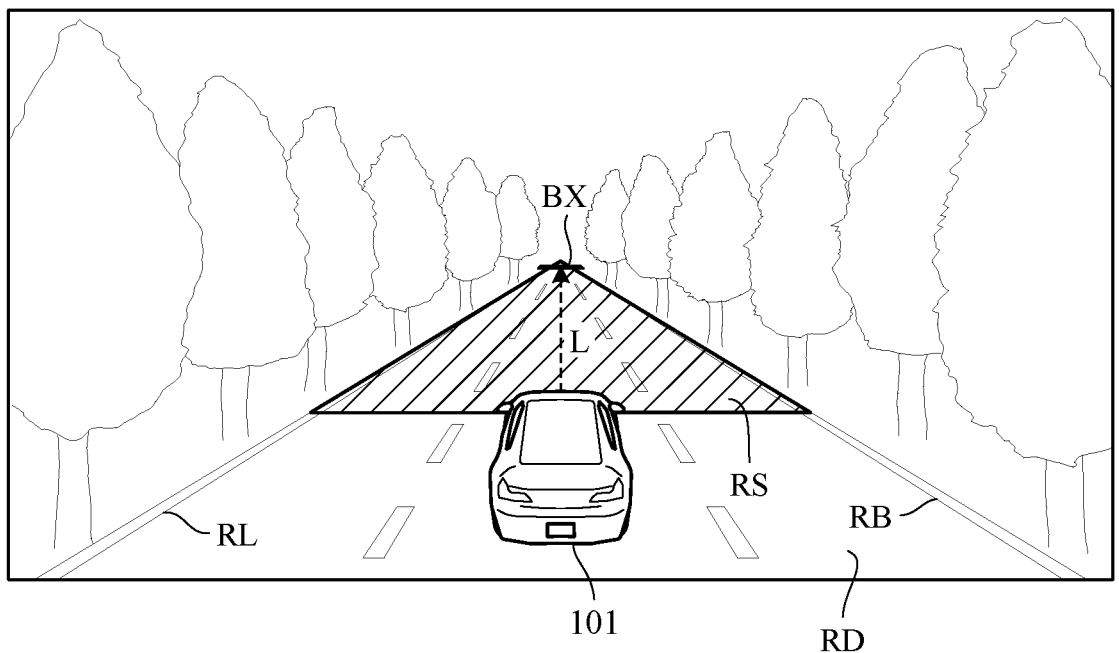
FIG. 3A is a diagram for describing a detection area of a LiDAR.
Figure 3B:
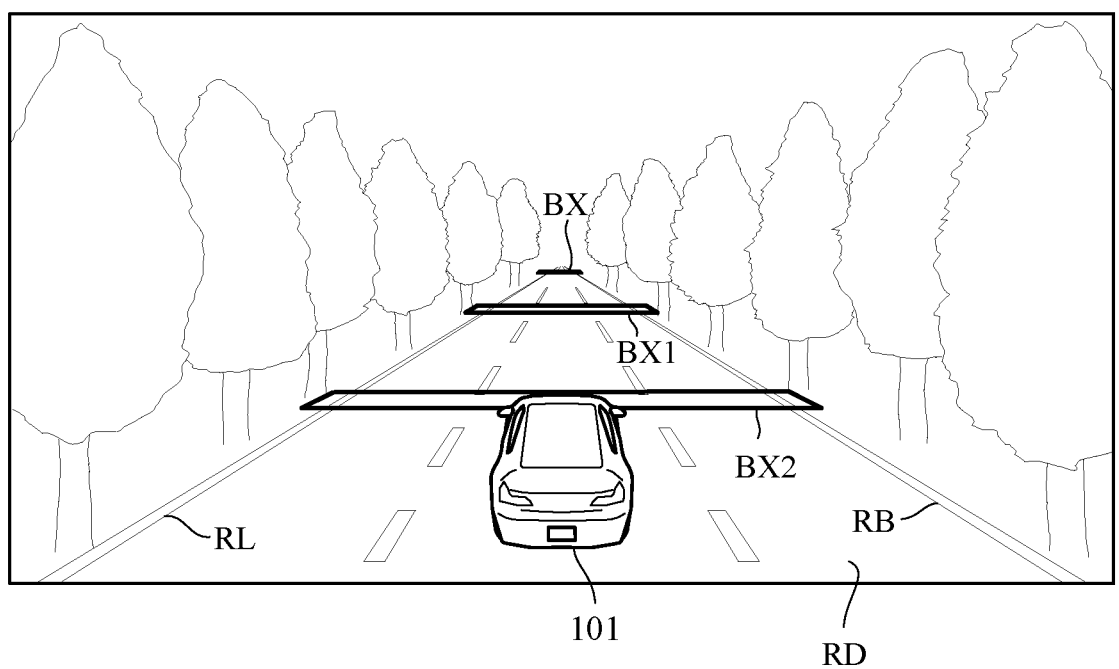
FIG. 3B is a diagram for describing the detection area of the LiDAR.

The exterior environment recognition apparatus 50, which serves as the division line recognition apparatus, sets a detection area for the LiDAR 5. FIGS. 3A and 3B are each a diagram for describing a detection area of the LiDAR 5, in a case of detecting three-dimensional objects and the like on the road RD in the traveling direction. In an embodiment, a road surface shape including unevenness, a step, an undulation, or the like of a road surface, a three-dimensional object located on the road RD (equipment related to the road RD (a traffic light, a traffic sign, a groove, a wall, a fence, a guardrail, and the like)), an object on the road RD (including other vehicles and an obstacle on the road surface), and a division line provided on the road surface will be referred to as three-dimensional objects and the like. The division line includes a white line (including a line of a different color such as yellow), a curbstone line, a road stud, and the like, and may be referred to as a lane mark. In addition, a three-dimensional object or the like that has been set beforehand as a target to detect will be referred to as a detection target. Since the LiDAR 5 receives scattered light with respect to the irradiation light, the first area set as an irradiation range of the irradiation light becomes a detection area. That is, the first area in an embodiment is the irradiation range as well as the detection area.

An area RS illustrated in FIG. 3A is a road segment that has been recognized by the recognition unit 111, while the subject vehicle 101 is traveling on the road RD of FIG. 1A. In an embodiment, an area corresponding to the road RD interposed between boundary lines RL and RB on the road RD will be referred to as a road segment.

A detection area BX illustrated in FIG. 3A corresponds to the first area set as an irradiation range at a location point on the road RD apart from the subject vehicle 101 by a predetermined depth distance. The length of an arrow line in FIG. 3A represents a depth distance L. As indicated by the arrow line, in an embodiment, the distance from the installation position of the LiDAR 5 to the center of a lower side of the detection area BX will be referred to as the depth distance. The depth distance is set to a predetermined length, based on the vehicle speed of the subject vehicle 101.

The detection area BX is set to include an area to be carefully looked at while driving in the self-drive mode. As an example, the center position in the road width direction of the detection area BX may be set to overlap with the center position in the road width direction of the road segment. In addition, the lateral width (a length in the road width direction) of the detection area BX is set to be longer than the road width at the depth distance L. Furthermore, the depth width of the detection area BX (a width in the up-down direction of the band-shaped area constituting the detection area BX) is set to a predetermined length, based on the vehicle speed of the subject vehicle 101.

Figure 4A:
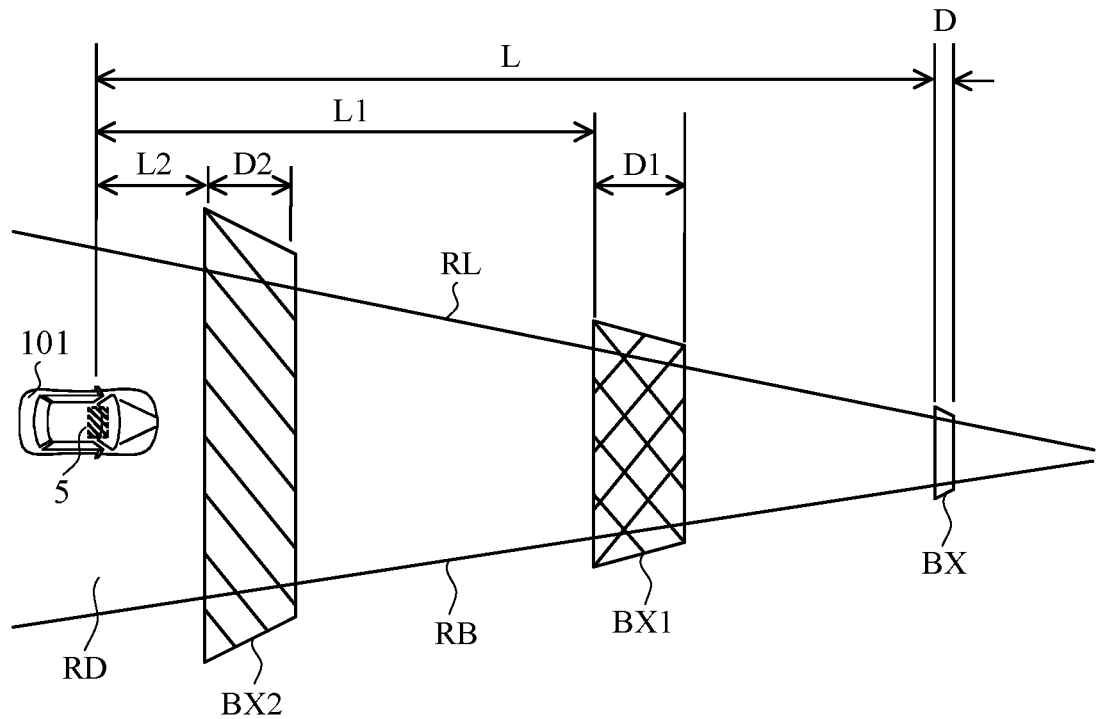
FIG. 4A is a diagram in which the detection area viewed from a viewpoint of FIG. 3B is extracted.

FIG. 3B is a diagram schematically illustrating the detection area BX, a detection area BX1, and a detection area BX2 to be set on the road RD in different depth distances from the subject vehicle 101. The three areas, detection areas BX, BX1, and BX2, are illustrated as examples for the purpose of describing their variability. In addition, FIG. 4A is a diagram in which the detection area BX, the detection area BX1, and the detection area BX2 are extracted, when viewed from the viewpoint of FIG. 3B. The detection area BX corresponds to the first area set on the road RD at a location point where the depth distance from the subject vehicle 101 is, for example, L=180 m. The detection area BX1 corresponds to the first area set on the road RD at a location point where the depth distance from the subject vehicle 101 is, for example, L1=100 m. The detection area BX2 corresponds to the first area set on the road RD at a location point where the depth distance from the subject vehicle 101 is, for example, L2=10 m.

In an embodiment, the exterior environment recognition apparatus 50 sets the first area, based on the driving speed of the subject vehicle 101. Since a braking distance increases as the driving speed of the subject vehicle 101 increases, it is necessary to further increase the depth distance to recognize a distant object in order to avoid a collision. Therefore, a function of changing the position of the detection area BX in accordance with the driving speed of the subject vehicle 101 is included. For example, when the subject vehicle 101 is stopped, the detection area BX2 as the first area is set on the road RD at the location point where the depth distance is L2=10 m. In addition, while the subject vehicle 101 is traveling at a vehicle speed of 100 km/h, the detection area BX1 as the first area is set on road RD at the location point where the depth distance L1=100 m. Furthermore, while the subject vehicle 101 is traveling at a vehicle speed of 180 km/h, the detection area BX as the first area is set on road RD at the location point where the depth distance is L=180 m.

As illustrated in FIGS. 3B and 4A, when viewed from the viewpoint of the LiDAR 5, the detection area BX having a longer depth distance from the subject vehicle 101 has a smaller size. However, in a situation in which the road width increases as the depth distance increases, the first area increases as the depth distance increases, in some cases.

<Breadth of Detection Area>

Figure 4B:
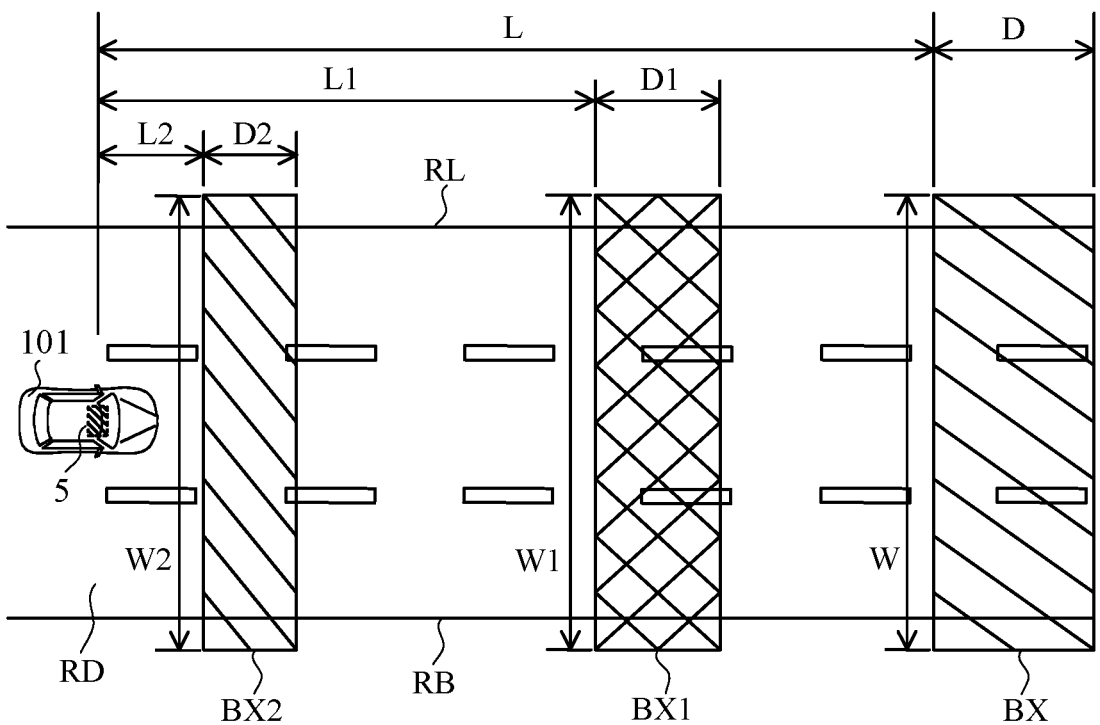
FIG. 4B is a diagram indicated the first area of FIG. 4A on a two-dimensional map.

FIG. 4B is a diagram illustrating each detection area of FIG. 4A on a two-dimensional map. In FIG. 4B, the smaller detection area viewed from the viewpoint of the LiDAR 5 has a larger area when indicated on the two-dimensional map. This is because a depth width D is set to be wider, as the depth distance L in the detection area BX from the subject vehicle 101 is longer. More specifically, in an embodiment, the detection area BX as the first area is set at a position where the depth distance is longer, as the vehicle speed of the subject vehicle 101 is faster as described above. When the vehicle speed is fast, the moving distance of the subject vehicle 101 in a measurement interval of the LiDAR 5 becomes long. Thus, by expanding the depth width of the detection area BX as the first area so as not to generate a blank section in the point cloud data (in other words, to be seamless in the traveling direction), the acquisition section of the point cloud data per measurement is enlarged.

<Light Projection Angle of Irradiation Light>

Figure 5A:
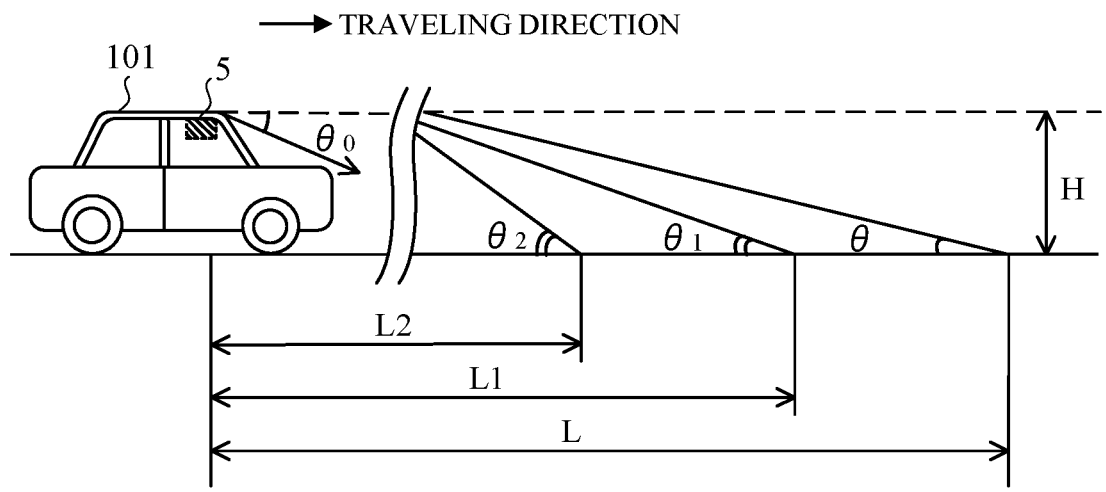
FIG. 5A is a schematic diagram for describing a light projection angle of the LiDAR.

FIG. 5A is a schematic diagram for describing a light projection angle θ0 (an angle of the irradiation light with respect to the horizontal direction) of the LiDAR 5. By changing the light projection angle θ0, the exterior environment recognition apparatus 50 changes the irradiation direction of the irradiation light upward and downward to adjust the depth distance on the road RD to be irradiated with the irradiation light.

In FIG. 5A, in a case where the irradiation light is irradiated on the road RD at the location point where the depth distance L2 is 10 m, the road surface is irradiated at an incident angle θ2. In addition, in a case where the irradiation light is irradiated on the road RD at the location point where the depth distance L1 is 100 m, the road surface is irradiated at an incident angle θ1. Furthermore, in a case where the irradiation light is irradiated on the road RD at the location point where the depth distance L is 180 m, the road surface is irradiated at an incident angle θ.

In general, in a case where the road gradient in the traveling direction is zero, the light projection angle θ0 matches the incident angle of the irradiation light on the road surface. The depth distance L in this situation is calculated by the following equation (1).

$$L = 1/\tan\theta 0 \times H \quad (1)$$

A reference sign H represents the height of the road surface, more specifically, the distance in the vertical direction from the installation position of the LiDAR 5 to the road surface.

The exterior environment recognition apparatus 50 decreases the light projection angle θ0 in a case where the depth distance is desired to be longer, and increases the light projection angle θ0 in a case where the depth distance is desired to be shorter. For example, in a case of changing the depth distance to 100 m from a state in which the irradiation light is irradiated on the location point where the depth distance is 70 m, the exterior environment recognition apparatus 50 makes the light projection angle θ0 smaller than the current light projection angle so that the irradiation light is irradiated on the location point where the depth distance is 100 m. In addition, for example, in a case where the road RD is a downward gradient or the like and the road RD is not irradiated with the irradiation light, the exterior environment recognition apparatus 50 makes the light projection angle θ0 larger than the current angle so that the road RD is irradiated with the irradiation light.

<Number of Irradiation Points of Irradiation Light>

The exterior environment recognition apparatus 50 calculates an irradiation point, to be irradiated with the irradiation light of the LiDAR 5, in the detection area BX1 which has been set as described above. More specifically, the exterior environment recognition apparatus 50 calculates an irradiation point in accordance with an angular resolution to be calculated based on a minimum size (for example, 15 cm in both length and width) of the detection target that has been designated beforehand and the depth distance (for example, L1 (100 m)). The angular resolution in this case needs to be 0.05 degrees in each of the up-down direction (may also be referred to as a vertical direction) and the left-right direction (may also be referred to as a road width direction) of a lattice point to be described later. Note that in a case where the detection target having a smaller size than 15 cm is detected, and in a case where the detection area is set to a depth distance longer than L1 (100 m), the number of irradiation points in the detection area may be increased to increase the angular resolution.

For example, the exterior environment recognition apparatus 50 calculates irradiation points arranged in a lattice pattern in the detection area BX1, and makes a space in the up-down direction and the left-right direction between the lattice points correspond to the angular resolution. In a case of increasing the angular resolution in the up-down direction, the detection area BX1 is divided in the up-down direction by the number based on the angular resolution, and a lattice space in the up-down direction is narrowed to increase the number of irradiation points. Conversely, in a case of reducing the angular resolution in the up-down direction, the detection area BX1 is divided in the up-down direction by the number based on the angular resolution, and the lattice space in the up-down direction is enlarged to reduce the number of irradiation points. The same applies to the left-right direction.

The exterior environment recognition apparatus 50 generates information (hereinafter, referred to as irradiation point information) indicating the position of the irradiation point that has been calculated in accordance with the angular resolution, and stores the information in the memory unit 12 in association with the position information indicating the current traveling position of the subject vehicle 101.

While the subject vehicle 101 is traveling in the self-drive mode, the exterior environment recognition apparatus 50 reads the irradiation point information corresponding to the current traveling position of the subject vehicle 101 from the memory unit 12, and sets the irradiation point of the LiDAR 5 in the detection area in accordance with the irradiation point information. Thus, the irradiation light from the LiDAR 5 is irradiated toward the irradiation point that has been set.

Note that the irradiation light of the LiDAR 5 may be irradiated in a raster scanning method, may be intermittently irradiated so that the irradiation light is irradiated only on the irradiation points arranged in the lattice pattern in the detection area, or may be irradiated in any other mode.

<Configuration of Exterior Environment Recognition Apparatus>

Details of the exterior environment recognition apparatus 50, which serves as the division line recognition apparatus, will be described.

As described above, the exterior environment recognition apparatus 50 includes the recognition unit 111, the defining unit 112, the setting unit 113, the mapping unit 114, and the LiDAR 5.

<Recognition Unit>

The recognition unit 111 recognizes a road structure in the traveling direction of the road RD on which the subject vehicle 101 travels, and a detection target on the road RD in the traveling direction, based on the image information that has been imaged by the camera 4 or the detection data that has been measured by the LiDAR 5. The road structure refers to, for example, a straight road, a curved road, a branch road, an entrance of a tunnel, and the like.

In addition, for example, by performing luminance filtering processing or the like on data indicating a flat road surface, the recognition unit 111 detects a division line. In this case, in a case where the height of the road surface on which the luminance exceeds a predetermined threshold is substantially the same as the height of the road surface on which the luminance does not exceed the predetermined threshold, the recognition unit 111 determines that it is a division line.

In a case where a second area and a third area are defined by the defining unit 112, and in addition to the detection area BX1 as the first area, a detection area BY1 as the second area and a detection area BZ1 as the third area are set for the LiDAR 5 by the setting unit 113, the detection area BY1 and the detection area BZ1 are also irradiated with the irradiation light from the LiDAR 5, in addition to the detection area BX1.

The recognition unit 111 generates three-dimensional point cloud data by using time-series detection data (measurement points) detected in the detection area BX1 by the LiDAR 5, and also generates three-dimensional point cloud data by using time-series detection data (measurement points) respectively detected in the detection area BY1 and the detection area BZ1 by the LiDAR 5.

Note that in a case where the only the detection area BX1 is irradiated with the irradiation light from the LiDAR 5 to acquire the detection data, it is unnecessary to generate the three-dimensional point cloud data in the detection area BY1 and the detection area BZ1.

<Recognition of Road Structure>

The recognition of the road structure by the recognition unit 111 will be described in more detail. The recognition unit 111 recognizes, as the boundary lines RL and RB of the road RD, a curbstone, a wall, a groove, a guardrail, or a division line on the road RD on a forward side, which is the traveling direction, included in the point cloud data that has been generated based on the detection area BX1. Then, the recognition unit 111 recognizes the road structure in the traveling direction indicated by the boundary lines RL and RB. As described above, the division line includes a white line (including a line of a different color), a curbstone line, a road stud, or the like, and a driving lane of the road RD is defined by markings with these division lines. In an embodiment, the lines corresponding to the boundary lines RL and RB on the road RD defined by the above markings will be referred to as division lines.

The recognition unit 111 recognizes an area interposed between the boundary lines RL and RB, as an area corresponding to the road RD (the above-described road segment). Note that the recognition method of the road segment is not limited to this, and the road segment may be recognized in any other method.

In addition, the recognition unit 111 recognizes, as a detection target, a road surface shape, such as unevenness, a step, and an undulation, that exceeds, for example, 15 cm, and an object that exceeds 15 cm in length and width, from among the three-dimensional objects and the like on the road RD in a road segment on a forward side, which is the traveling direction, included in the point cloud data that has been generated based on the detection area BX1.

<Recognition of Detection Target>

The recognition of the detection target by the recognition unit 111 will be described in more detail. In a case where the second area and the third area are defined by the defining unit 112, and in addition to the detection area BX1, the detection area BY1 corresponding to the second area and the detection area BZ1 corresponding to the third area are also irradiated with the irradiation light from the LiDAR 5, the recognition unit 111 recognizes, as a detection target, a road surface shape of, for example, approximately 100 cm and an object of, for example, approximately 100 cm in length and width, from among three-dimensional objects and the like on the road RD in the road segment on a forward side, which is the traveling direction, included in the point cloud data that has been generated based on the detection area BY1 and the detection area BZ1.

Note that in a case where the LiDAR 5 irradiates only the detection area BX1 with the irradiation light to acquire the detection data, the recognition unit 111 may recognize the road surface shape of the road RD and the detection target in the road segment on a forward side in the traveling direction, based on the point cloud data that has been generated based on the detection area BX1.

<Defining Unit>

The defining unit 112 defines the above-described first area as an irradiation range to be irradiated with the irradiation light by the LiDAR 5. More specifically, as illustrated in FIG. 4B, the defining unit 112 defines a band-shaped first area having a predetermined depth width D1 at a position on the road RD apart from the subject vehicle 101 in the traveling direction by a predetermined distance (for example, the depth distance L1).

As described above, the defining unit 112 calculates the depth distance L1 from the current position of the subject vehicle 101 to the first area and the depth width D1 of the first area (the width of the band-shaped area constituting the first area), based on the vehicle speed of the subject vehicle 101 that has been detected by the vehicle speed sensor of the internal sensor group 3. In a similar manner, the defining unit 112 calculates the depth distance L2 from the current position of the subject vehicle 101 to the first area and a depth width D2 of the first area, and the depth distance L from the current position of the subject vehicle 101 to the first area and the depth width D of the first area.

With such a configuration, when the LiDAR 5 intermittently irradiates the detection area BX1 corresponding to the first area with the irradiation light from the subject vehicle 101 moving on the road RD, it becomes possible to define the first area so that the point cloud data detected by the LiDAR 5, based on the irradiation light at a previous time, and the point cloud data detected by the LiDAR 5, based on the irradiation light at a current time, are connected with each other seamlessly in the traveling direction. Thus, it becomes possible to acquire seamless detection data of the LiDAR 5 in the traveling direction.

The defining unit 112 calculates a length W1 in the road width direction of the band-shaped area constituting the first area (corresponding to the detection area BX1), based on the road structure that has been recognized by the recognition unit 111. The defining unit 112 calculates the length W1 so as to be sufficiently longer than the road width of the road RD at the location point of the depth distance L1. In a similar manner, the defining unit 112 calculates a length W2 at the location point of the depth distance L2 and the length W at the location point of the depth distance L.

With such a configuration, left and right ends (the boundary lines RL and RB) of the road RD are included in the detection data of the LiDAR 5.

Figure 5B:
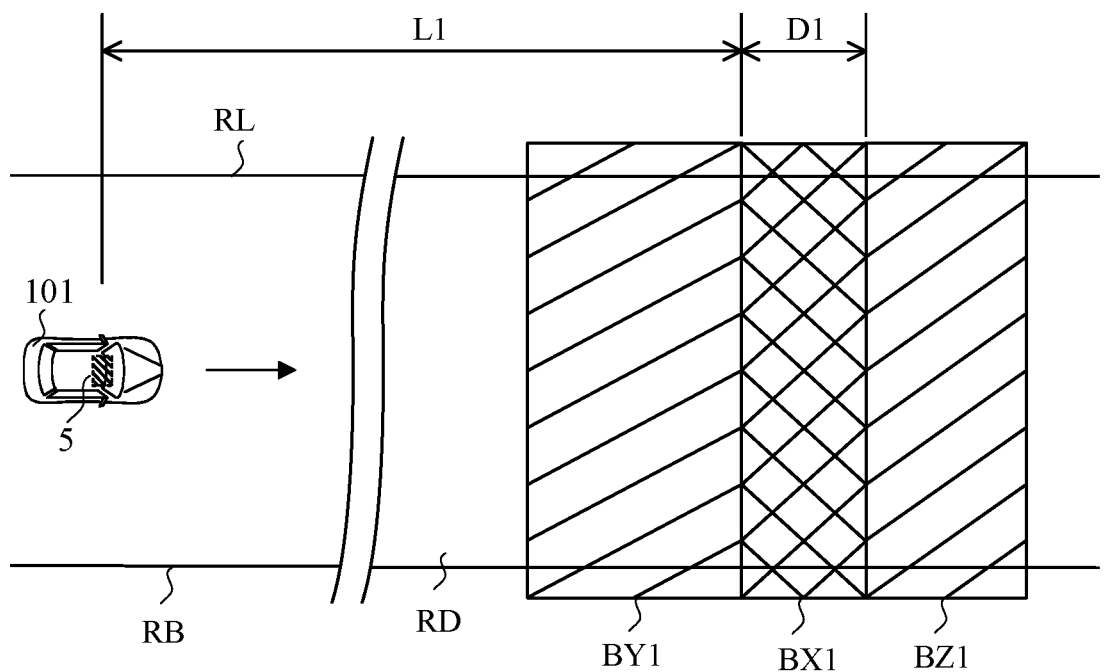
FIG. 5B is a diagram for describing a second area and a third area.

In addition, as illustrated in FIG. 5B, the defining unit 112 may define the second area on the road RD closer to the subject vehicle 101 than the first area corresponding to the detection area BX1 (in other words, the distance from the subject vehicle 101 is shorter than the depth distance L1), and a third area on the road RD farther from the subject vehicle 101 than the first area (in other words, the distance from the subject vehicle 101 is longer than the depth distance L1 plus the depth width D1).

<Setting Unit>

The setting unit 113 sets the detection area BX1 corresponding to the first area for the LiDAR 5, based on the first area that has been defined by the defining unit 112. As described above, in an embodiment, the detection area BX1 corresponds to the irradiation range of the irradiation light.

In addition, in a case where the second area and the third area are defined by the defining unit 112, the setting unit 113 respectively sets the detection area BY1 corresponding to the second area and the detection area BZ1 corresponding to the third area for the LiDAR 5, based on the second area and the third area. In an embodiment, the detection areas BY1 and BZ1 also correspond to the irradiation ranges of the irradiation light.

<Different Angular Resolution>

The setting unit 113 calculates and sets the number of irradiation points (in other words, the irradiation point density) in the detection area BX1 corresponding to the above-described first area, based on the angular resolution in the measurement necessitated for the LiDAR 5. As described above, the irradiation points arranged in a lattice pattern in the detection area BX1 are calculated, and the space between the lattice points in the up-down direction and the left-right direction is made to correspond to the angular resolution.

In addition, in a case of respectively setting the detection area BY1 corresponding to the second area and the detection area BZ1 corresponding to the third area for the LiDAR 5, the setting unit 113 respectively calculates and sets the number of irradiation points for a first resolution for the detection area BX1 and the number of irradiation points for a second resolution having density lower than that of the first resolution for the detection area BY1 and the detection area BZ1. The first resolution corresponds to, for example, the number of irradiation points necessary for detecting a three-dimensional object or the like that exceeds 15 cm on the road RD at the location point where the depth distance L1 is 100 m. The second resolution corresponds to, for example, the number of irradiation points necessary for detecting a three-dimensional object or the like that exceeds 100 cm on the road RD at the location point where the depth distance L1 is 100 m.

<Mapping Unit>

The mapping unit 114 maps data (mapping) indicating the position (including the position of the division line) of the detection target that has been detected based on the time-series point cloud data that has been measured in real time by the LiDAR 5, on a two-dimensional map similar to FIG. 4B, for example, and generates continuous position data.

More specifically, the mapping unit 114 acquires the position information of all the three-dimensional objects or the like (excluding a division line) on the two-dimensional map stored in the memory unit 12, and calculates a relative position of the three-dimensional object or the like through coordinate conversion with the position of the subject vehicle 101 as the center, based on a moving speed and a moving direction (for example, an azimuth angle) of the subject vehicle 101. Whenever the point cloud data is acquired by the LiDAR 5 in a main measurement (step S310) to be described later, the mapping unit 114 performs the coordinate conversion of the relative position of the three-dimensional object or the like based on the point cloud data that has been acquired with the position of the subject vehicle 101 as the center, and records a converted one on the two-dimensional map.

In addition, the mapping unit 114 acquires the position information of all division lines on the two-dimensional map stored in the memory unit 12, and calculates the relative position of the above division line through the coordinate conversion with the position of subject vehicle 101 as the center, based on the moving speed and the moving direction of subject vehicle 101. Whenever the point cloud data is acquired in the main measurement (step S310) to be described later, the mapping unit 114 performs the coordinate conversion with the position of the subject vehicle 101 as the center for the relative position of the division line based on the point cloud data that has been acquired, and records the converted relative position on the two-dimensional map.

<Description of Flowchart>

Figure 6:
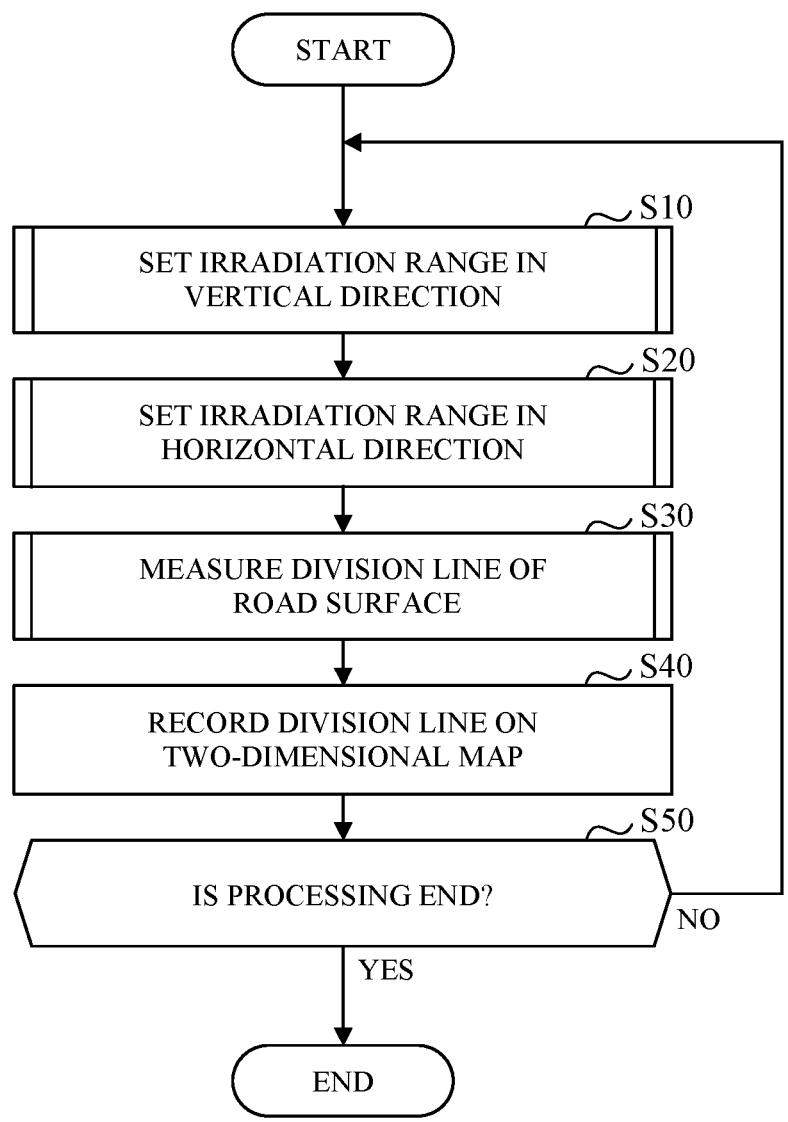
FIG. 6 is a flowchart illustrating an example of processing performed by the processing unit of the controller in FIG. 2.

FIG. 6 is a flowchart illustrating an example of processing performed by the processing unit 11 of the controller 10 in FIG. 2 in accordance with a predetermined program. The processing illustrated in the flowchart of FIG. 6 is repeated, for example, on every predetermined cycle, while the subject vehicle 101 is traveling in the self-drive mode.

First, in step S10, the processing unit 11 sets an irradiation range in the vertical direction of the irradiation light by the LiDAR 5. More specifically, the processing unit 11 adjusts the irradiation range of the irradiation light in the vertical direction by changing the light projection angle θ0 so that the band-shaped irradiation light that is long in the road width direction is irradiated on a location point of a predetermined depth distance L1 (for example, 100 m) on the road RD, and the processing proceeds to step S20.

Since the irradiation range of the irradiation light is adjusted in the vertical direction in step S10, even in a case where the depth distance to which the irradiation light is irradiated changes depending on a height H or a gradient of the road surface of the road RD, it becomes possible to correct the irradiation range of the irradiation light in the vertical direction before the main measurement in step S30 to be described later. Details of the processing in step S10 will be described later with reference to FIG. 7.

In step S20, the processing unit 11 sets the irradiation range in the horizontal direction (the road width direction) of the irradiation light by the LiDAR 5. More specifically, the length W1 in the road width direction of the band-shaped irradiation range is adjusted to be longer than the road width at the location point of the predetermined depth distance L1

(for example, 100 m) on the road RD so that left and right ends of the road are irradiated with the irradiation light, and the processing proceeds to step S30.

Since the irradiation range of the irradiation light is adjusted in the road width direction in step S20, even in a case where the left and right ends (the boundary lines RL and RB) of the road RD deviate from the irradiation range of the irradiation light because of a curve of the road RD, it becomes possible to correct the irradiation range of the irradiation light in the road width direction before the main measurement in step S30 to be described later. Details of the processing in step S20 will be described later with reference to FIG. 8.

In step S30, the processing unit 11 outputs an irradiation instruction to the LiDAR 5 through the CAN communication line or the like, and measures the road surface information indicating the division line of the road surface, based on the point cloud data that has been acquired by the LiDAR 5 in accordance with the irradiation instruction. More specifically, a white line (including a line of a different color such as yellow), a curbstone line, a road stud, and the like as predetermined detection targets are detected, and the processing proceeds to step S40. Details of the processing in step S30 will be described later with reference to FIG. 9.

In step S40, the processing unit 11 maps the relative position of the division line based on the point cloud data measured in step S30 on the two-dimensional map, and thus generates two-dimensionally continuous position data, and the processing proceeds to step S50.

More specifically, whenever the point cloud data is acquired by the LiDAR 5 in the main measurement to be described later (step S310), the mapping unit 114 of the processing unit 11 performs the coordinate conversion with the position of the subject vehicle 101 as the center for the relative position of the division line based on the point cloud data that has been acquired, and records the converted relative position on the two-dimensional map.

In step S50, the processing unit 11 determines whether to end the processing. In a case where the subject vehicle 101 is continuously traveling in the self-drive mode, the processing unit 11 makes a negative determination in step S50, returns to step S10, and repeats the above-described processing. By returning to step S10, the measurement of the three-dimensional object or the like based on the point cloud data is periodically and repeatedly performed, while the subject vehicle 101 is traveling. On the other hand, in a case where the subject vehicle 101 has finished traveling in the self-drive mode, the processing unit 11 makes a positive determination in step S50, and ends the processing of FIG. 6.

Figure 7:
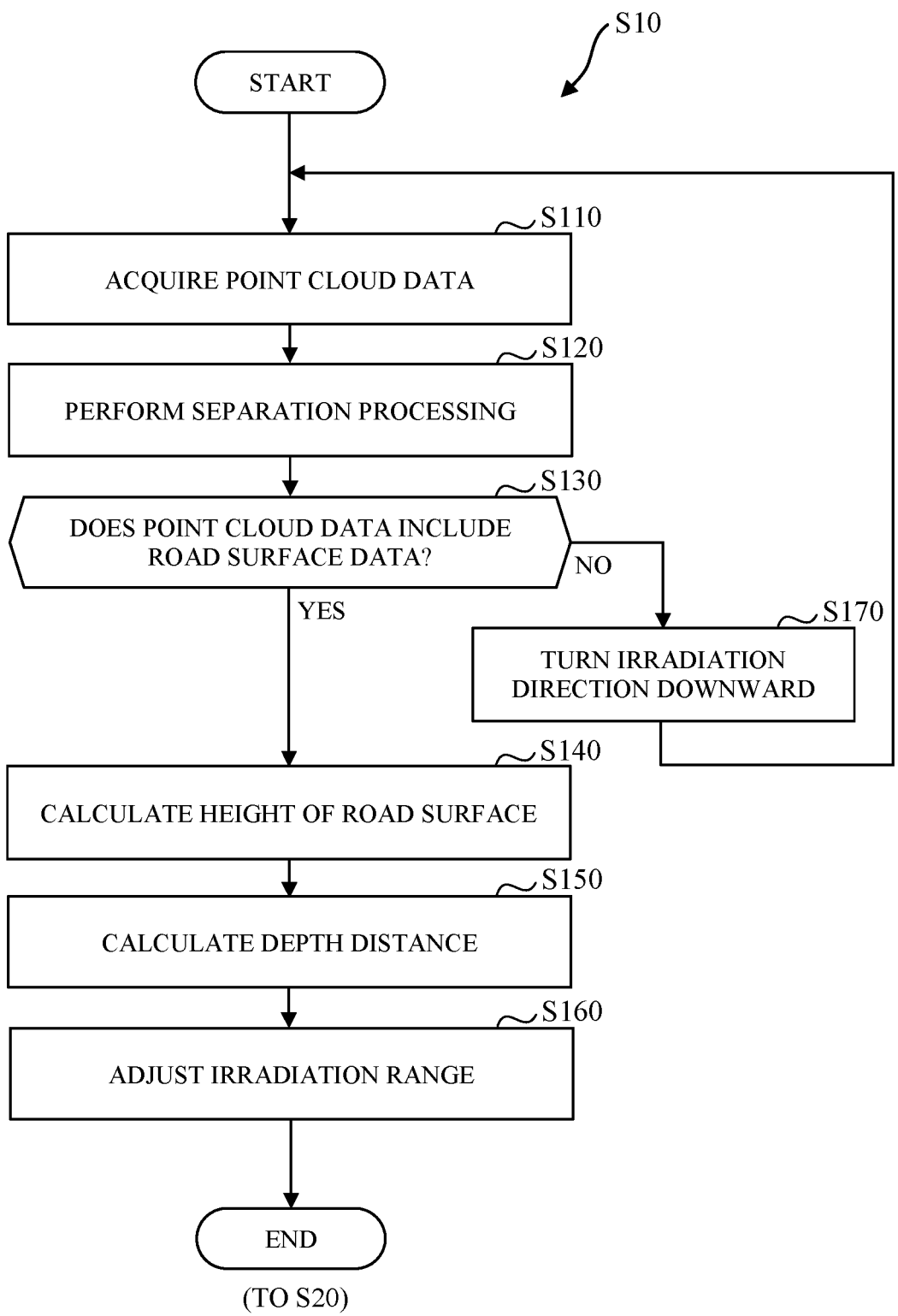
FIG. 7 is a flowchart for describing details of the processing of step S10 of FIG. 6.

FIG. 7 is a flowchart for describing details of the processing of step S10 (FIG. 6) performed by the processing unit 11.

In step S110, the processing unit 11 acquires three-dimensional point cloud data by using the detection data that has been detected by the LiDAR 5, and proceeds to step S120. The measurement by the LiDAR 5 for acquiring the point cloud data in step S110 may be referred to as a first preliminary measurement. The first preliminary measurement is for determining whether the irradiation light of the LiDAR 5 is being irradiated on the detection area BX1 (corresponding to the first area) on the road RD at the location point of the depth distance L1 (for example, 100 m).

In step S120, the processing unit 11 performs separation processing, and then proceeds to step S130. More specifically, by using a publicly known method or the like, data of the three-dimensional objects and the like on the road RD are detected and separated from the point cloud data generated in step S110, and point cloud data indicating a flat road surface is obtained. The three-dimensional objects and the like include, for example, a curbstone, a wall, a groove, a guardrail, and the like provided at the left and right ends of the road RD, and in addition, other vehicles such as a motorcycle that is traveling.

In step S130, the processing unit 11 determines whether the point cloud data obtained in step S120 includes road surface data. As an example, the processing unit 11 calculates a histogram of height data from the point cloud data, and determines that the road surface data is present in a case where the number of all points of a mountain having a peak top is equal to or larger than a predetermined threshold. In addition, the processing unit 11 acquires the height H of the road surface, based on the position of the mountain having the peak top. Any other method may be used for determining the presence or absence of the road surface data and acquiring the height H of the road surface.

In a case where the road surface data is present (in other words, flat data having a value higher than a noise level is present in the road width direction), the processing unit 11 makes a positive determination in step S130, and proceeds to step S140. In a case where no road surface data is present (in other words, only data of a noise level is present), the processing unit 11 makes a negative determination in step S130, and proceeds to step S170.

A case of proceeding to step S170 is a case where the road RD is not irradiated with the irradiation light because of the above-described downward gradient or the like. In step S170, the processing unit 11 sends the LiDAR 5 an instruction to make the light projection angle θ0 larger than a current value so that the road RD is irradiated with the irradiation light, returns to step S110, and then repeats the above-described processing.

A case of proceeding to step S140 is a case where the road RD is irradiated with the irradiation light, and thus the scattered light is received by the LiDAR 5. In step S140, the processing unit 11 calculates the height H of the road surface as described above, based on the point cloud data obtained in step S120, and proceeds to step S150.

In step S150, the processing unit 11 calculates the depth distance by substituting the height H of the road surface calculated in step S140 and the light projection angle θ0 set in the LiDAR 5 into the above equation (1), and the proceeds to step S160.

In step S160, the processing unit 11 adjusts the irradiation range of the irradiation light by the LiDAR 5 in the vertical direction (may be referred to as a depth direction), and ends the processing in accordance with FIG. 7. More specifically, for the LiDAR 5, with regard to the irradiation range set for the irradiation at a next time, by changing the light projection angle θ0, the irradiation light is caused to be irradiated on the detection area BX1 (corresponding to the first area) at the location point of the depth distance L1 (for example, 100 m).

Figure 8:
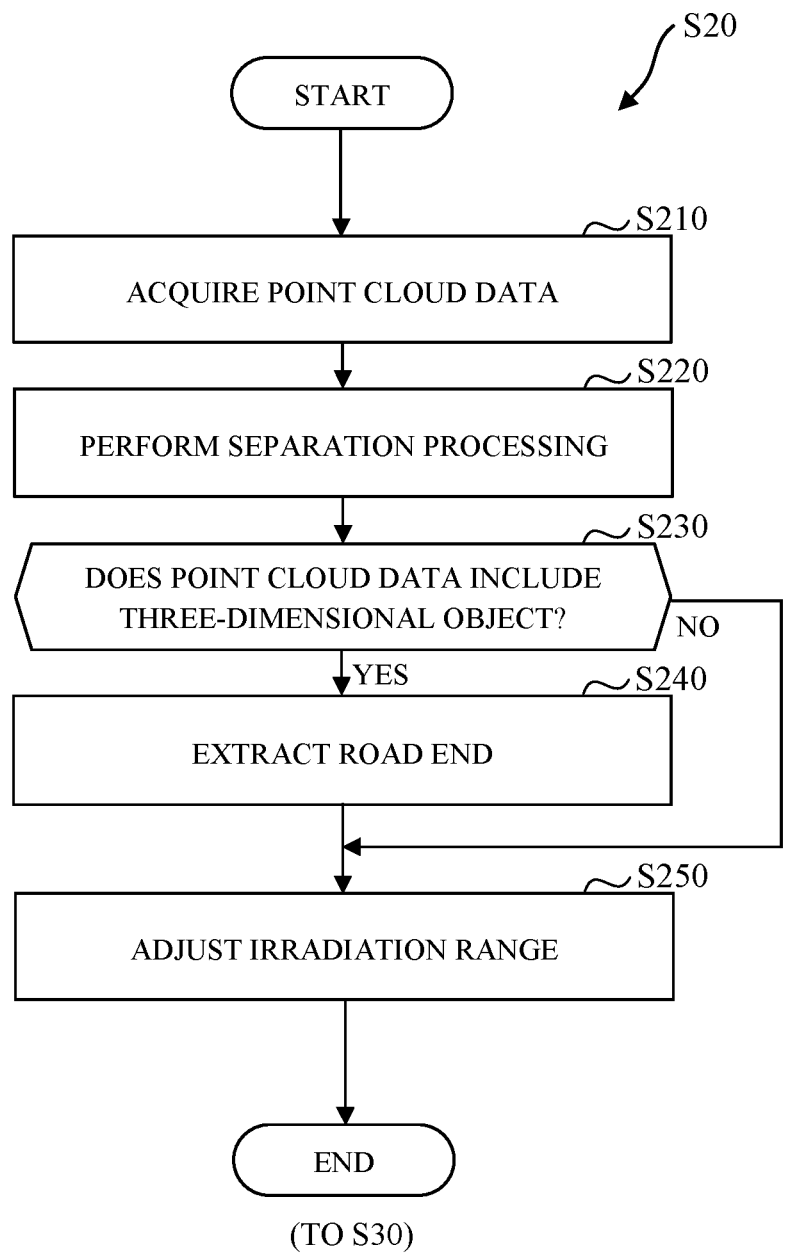
FIG. 8 is a flowchart for describing details of the processing of step S20 of FIG. 6.

FIG. 8 is a flowchart for describing details of the processing of step S20 (FIG. 6) performed by the processing unit 11.

In step S210, the processing unit 11 acquires three-dimensional point cloud data, by using the detection data that has been detected by the LiDAR 5, and proceeds to step S220. The measurement by the LiDAR 5 for acquiring the point cloud data in step S210 may be referred to as a second preliminary measurement. The second preliminary measurement is for determining whether a road end on the road RD at the location point of the depth distance L1 (for example, 100 m) is included in the irradiation range of the LiDAR 5.

In step S220, the processing unit 11 performs separation processing, and then proceeds to step S230. More specifically, by using a publicly known method or the like, data of the three-dimensional objects and the like on the road RD are detected from the point cloud data generated in step S210 and separated from the road surface data, and thus the point cloud data indicating the three-dimensional objects and the like is obtained. The three-dimensional objects and the like include a curbstone, a wall, a groove, a guardrail, and the like that have been described above, and in addition, other vehicles such as a motorcycle that is traveling.

In step S230, the processing unit 11 determines whether the point cloud data that has been separated includes data indicating a three-dimensional object or the like. In a case where there is the data indicating the three-dimensional object or the like, the processing unit 11 makes a positive determination in step S230, and proceeds to step S240. In a case where there is no data indicating the three-dimensional object or the like (in other words, only the flat road surface data is present in the road width direction that intersects the traveling direction), the processing unit 11 makes a negative determination in step S230, and proceeds to step S250.

In step S240, the processing unit 11 extracts data indicating a road end, based on the point cloud data indicating the three-dimensional object or the like, and proceeds to step S250. As an example, the processing unit 11 extracts the data indicating a curbstone, a wall, a groove, a guardrail, and the like substantially parallel to the traveling direction of the subject vehicle 101, but does not extract the data indicating a three-dimensional object or the like in the road width direction that intersects the traveling direction.

In step S250, the processing unit 11 adjusts the irradiation range of the irradiation light by the LiDAR 5 in the horizontal direction (the road width direction), and ends the processing of FIG. 8. Specifically, by setting the irradiation range set to the LiDAR 5 for the irradiation at a next time so that the length W1 in the road width direction of the detection area BX1 (corresponding to the first area) is longer than the road width of the road RD at the location point of the depth distance L1, the left and right ends (the boundary lines RL and RB) of the road RD at the location point of the depth distance L1 are made to be included in the irradiation range at a next time.

For example, in a case where the data indicating one of the left and right ends is not extracted in step S240, one end position from which the above data is not extracted between both ends in the road width direction of the detection area BX1 for the irradiation at a next time is set to be enlarged by a predetermined amount, based on the both end positions and the length W1 in the road width direction of the currently set detection area BX1 (corresponding to the first area).

In addition, in a case where the data indicating the three-dimensional object or the like is not present and the negative determination is made in step S230 (for example, only the data of a flat road surface is present in the road width direction that intersects the traveling direction, and the data indicating the left and right ends of the road RD is not present), the processing unit 11 sets, in step S250, the length W1 of the detection area BX1 for the irradiation at a next time to be enlarged at a predetermined magnification from the both end positions of the currently set detection area BX1 to both left and right sides, based on the both end positions and the length W1 in the road width direction of the currently set detection area BX1 (corresponding to the first area).

Note that the length W1 in the road width direction of the detection area BX1 (corresponding to the first area) set in step S250 may be subjected to filtering processing such as a state space model, a Kalman filter, or the like in order to ensure time-series continuity. The positions in the road width direction (the positions of the left end and the right end) of the detection area BX1 may be set based on the position information that has been measured by the position measurement unit 2 and the high-precision map information stored in the memory unit 12.

Figure 9:
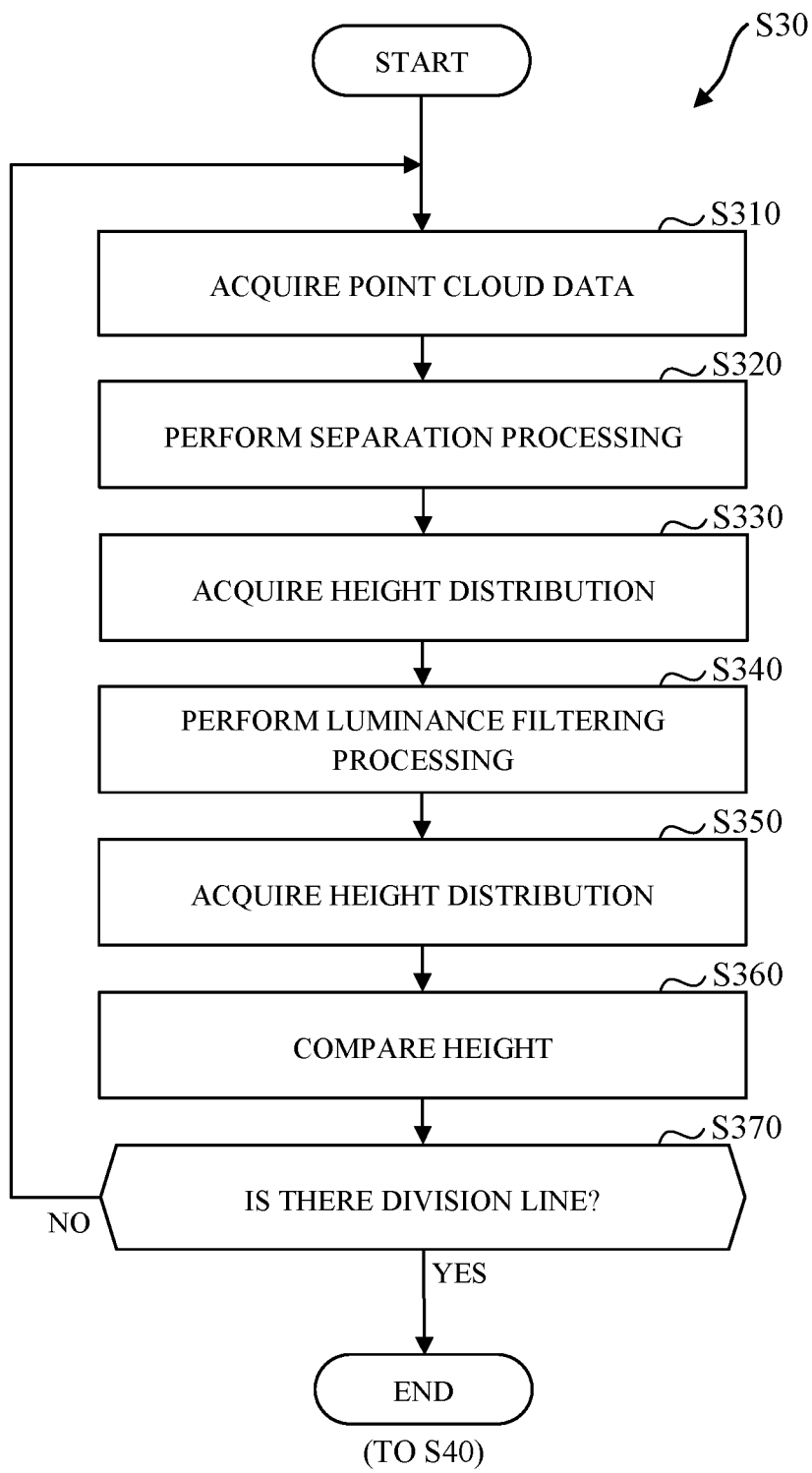
FIG. 9 is a flowchart for describing details of the processing of step S30 of FIG. 6.

FIG. 9 is a flowchart for describing details of the processing of step S30 (FIG. 6) performed by the processing unit 11.

In step S310, the processing unit 11 acquires three-dimensional point cloud data by using the detection data that has been detected by the LiDAR 5, and proceeds to step S320. The measurement by the LiDAR 5 for acquiring the point cloud data in step S310 may be referred to as the main measurement. The main measurement is for detecting, by the LiDAR 5, a predetermined three-dimensional object or the like together with the division line as predetermined detection targets.

In step S320, the processing unit 11 performs separation processing, and then proceeds to step S330. More specifically, by using a publicly known method or the like, data of the three-dimensional objects and the like on the road RD is detected and separated from the point cloud data generated in step S310, and thus point cloud data indicating a flat road surface is left. The three-dimensional objects and the like include a curbstone, a wall, a groove, a guardrail, and the like which exceed, for example, 15 cm, and in addition, other vehicles such as a motorcycle that is traveling.

In step S330, the processing unit 11 acquires height distribution of the road surface, based on the point cloud data separated in step S320, and proceeds to step S340. As an example, the processing unit 11 calculates a histogram of the height data from the point cloud data, and calculates an average value of all points of a mountain having a peak top. Alternatively, a value at which the peak top is located (a value of the height data) is calculated. Such a calculated value represents the height H of the road surface of the entire road surface including the division line. Any other method may be used for acquiring the height distribution of the road surface.

In step S340, the processing unit 11 performs luminance filtering processing on the point cloud data separated in step S320, and removes data having luminance equal to or smaller than a predetermined threshold. This is based on an approach that the luminance of a part on the road surface that does not correspond to the division line is equal to or smaller than the above threshold. A fixed value may be used for the above threshold. Alternatively, a threshold that changes depending on the depth distance where the detection area BX is located, more specifically, a threshold that decreases as the depth distance increases may be set. This is because both the reflection intensity on the road surface and the reflection intensity on the white line tend to decrease as the distance becomes farther, and thus the threshold is made changeable depending on the distance, so the separation accuracy between the road surface and the white line is further improved. In a case where the road surface data that exceeds the above threshold (in other words, there is a possibility of a division line) is left, the processing unit 11 proceeds to step S350.

In step S350, the processing unit 11 acquires the height distribution of the road surface, based on the point cloud data left in step S340, and proceeds to step S360. As an example, the processing unit 11 calculates a histogram of the height data from the point cloud data, and calculates an average value of all points of a mountain having a peak top. Alternatively, a value at which the peak top is located (a value of the height data) is calculated.

In step S360, the processing unit 11 compares the height of the road surface (the entire road surface) calculated in step S330 with the height of the road surface (the road surface with the luminance exceeding the threshold) calculated in step S350, and proceeds to step S370.

In step S370, the processing unit 11 determines whether there is a division line, based on a comparison result in step S360. For example, in a case where the absolute value of a difference between an average value of the mountain data of the entire road surface and an average value of the mountain data corresponding to a part where the luminance exceeds the threshold is equal to or smaller than a predetermined determination threshold, that is, in a case where the height of a part (a first part) where the luminance exceeds the threshold is substantially the same as the height of a part (a second part) where the luminance is equal to or smaller than the threshold, the processing unit 11 makes a positive determination in step S370, ends the processing of FIG. 9, and proceeds to step S40 in FIG. 6. In this situation, the processing unit 11 (the recognition unit 111) detects the part where the luminance exceeds the threshold as a division line, and recognizes its detection position as information indicating the division line.

In a case where the absolute value of the difference between the average value of the mountain data of the entire road surface and the average value of the mountain data corresponding to the part where the luminance exceeds the threshold is larger than the predetermined determination threshold, the processing unit 11 makes a negative determination in step S370, and returns to step S310. A case of making the negative determination in step S370 is a case where it cannot be said that the point cloud data of a high-luminance part left in step S340 is the data on the road surface (for example, the high-luminance part is present on a three-dimensional object). In addition, as another example of the determination threshold, a positive determination may be made in a case where the absolute value of a difference between a value located at a peak top of the mountain in the height data of the entire road surface and a value located at a peak top of the mountain in the height data corresponding to the part where the luminance exceeds the threshold is equal to or smaller than the predetermined determination threshold, and a negative determination may be made in a case where the absolute value is larger than the determination threshold.

According to the embodiments described above, the following operations and effects are obtained.

(1) The exterior environment recognition apparatus 50, which serves as the division line recognition apparatus, includes the LiDAR 5, which serves as an in-vehicle detection unit that irradiates surroundings of the subject vehicle 101 with irradiation light as an electromagnetic wave and that detects an exterior environment situation in the surroundings in a time-series manner, and the processing unit 11, which serves as a road surface information acquisition unit, and which acquires road surface information of the road RD on which the subject vehicle 101 travels, based on information that has been detected by the LiDAR 5. The processing unit 11 includes the recognition unit 111 that recognizes information indicating a division line in a first area (corresponding to the detection area BX1) on the road RD at respectively different positions on the road RD and separated from the subject vehicle 101 by a predetermined distance, and the mapping unit 114 that maps the information indicating the division line that has been recognized by the recognition unit 111, based on the traveling direction and the driving speed of the subject vehicle 101.

Since the processing unit 11 is configured to acquire the road surface information of the first area on the road RD, it becomes possible to reduce the number of irradiation points to be irradiated with the irradiation light by the LiDAR 5, as compared with a case where the road surface information of the entire road surface of the road RD is acquired at a time. In addition, since the mapping unit 114 maps the information that has been recognized by the recognition unit 111 constituting the processing unit 11, based on the traveling direction and the driving speed of the subject vehicle 101, the traveling of the subject vehicle 101 can be regarded as substantial scanning traveling. Accordingly, even in a case where the first area does not cover the entire road surface in the traveling direction of the road RD, it becomes possible to cover the road surface information of the entire road surface of the road RD.

With the above configuration, it becomes possible to reduce the number of irradiation points by the LiDAR 5 without degrading the recognition accuracy of the position or the width of the division line to be a detection target of the exterior environment recognition apparatus 50, which serves as the division line recognition apparatus. The reduction in the number of irradiation points also leads to a reduction in the processing load of the processing unit 11.

For example, in a case where an imaging environment of the camera 4 is degraded resulting from backlight, weather, or the like, it is highly useful to recognize the division line of the road RD with accuracy, based on the point cloud data that has been acquired by the LiDAR 5.

(2) In the division line recognition apparatus (the exterior environment recognition apparatus 50) in the above (1), the recognition unit 111 further recognizes information indicating a predetermined detection target in a second area (corresponding to the detection area BY1) on the road RD closer to the subject vehicle 101 than the first area (corresponding to the detection area BX1) and a third area (corresponding to the detection area BZ1) on the road RD farther from the subject vehicle 101 than the first area, respectively at different positions on the road RD.

With such a configuration, it becomes possible to enlarge a range from which the road surface information is acquired in the traveling direction of the road RD, as compared with a case where the processing unit 11 acquires the road surface information only in the first area (corresponding to the detection area BX1) on the road RD. Also in this case, it becomes possible to reduce the number of irradiation points to be irradiated with the irradiation light by the LiDAR 5, as compared with a case where the road surface information of the entire road surface of the road RD is acquired at a time.

Furthermore, for example, in a scenario in which a flying object suddenly falls on a position deviated from the detection area BX1 on an advancing route of the subject vehicle 101, and when it falls into the detection area BY1 or BZ1, it becomes possible to recognize this.

(3) In the division line recognition apparatus (the exterior environment recognition apparatus 50) in the above (2), the recognition unit 111 recognizes the information indicating the detection target with the first resolution in the first area (corresponding to the detection area BX1), and recognizes the information indicating the detection target with the second resolution lower than the first resolution in the second and third areas (corresponding to the detection areas BY1 and BZ1).

With such a configuration, for example, while ensuring higher recognition accuracy in the first area and lowering the recognition accuracy in the second and third areas than that of the first area, it becomes possible to appropriately reduce the number of irradiation points to be irradiated with the irradiation light by the LiDAR 5.

(4) In the division line recognition apparatus (the exterior environment recognition apparatus 50) in the above (1), the processing unit 11 further includes the defining unit 112, which calculates a predetermined distance, based on the vehicle speed of the subject vehicle 101, and which defines, as the first area, a band-shaped area that intersects the road RD on the road RD separated from the subject vehicle 101 in the traveling direction by the predetermined distance, that has a depth width based on the vehicle speed, and that is long in the road width direction.

With such a configuration, the defining unit 112 is capable of defining the first area (corresponding to the detection area BX1) so that the left and right ends of the road RD are irradiated with the irradiation light. In a case where the LiDAR 5 intermittently irradiates, with the irradiation light, the detection area BX1 corresponding to the first area from the subject vehicle 101, which moves on the road RD, the defining unit 112 is further capable of defining the first area so that the road surface information acquired by the processing unit 11, based on the irradiation light at a previous time, and the road surface information acquired by the processing unit 11, based on the irradiation light at a current time, are connected with each other seamlessly in the traveling direction.

(5) In the division line recognition apparatus (the exterior environment recognition apparatus 50) in the above (4), the processing unit 11 further includes the setting unit 113 that sets the irradiation direction (the light projection angle θ0) of the irradiation light for the LiDAR 5 so that at least the irradiation light scattered on the road surface of the first area (corresponding to the detection area BX1) is detected.

With such a configuration, for example, in a case where the depth distance irradiated with the irradiation light changes depending on the height H or a gradient of the road surface of the road RD, it becomes possible to correct the irradiation range of the irradiation light. In addition, also in a case where the left and right ends (the boundary lines RL and RB) of the road RD deviate from the irradiation range of the irradiation light because of a curve of the road RD, it becomes possible to correct the irradiation range of the irradiation light.

(6) In the division line recognition apparatus (the exterior environment recognition apparatus 50) in the above (5), the recognition unit 111 further recognizes the road surface data in the traveling direction of the subject vehicle 101, based on the information that has been detected in a preliminary measurement before a main measurement of the LiDAR 5, and the setting unit 113 sets the irradiation range in the vertical direction and in the road width direction for irradiating the first area on the road RD with the irradiation light, based on the predetermined distance and road surface data.

With such a configuration, it becomes possible to correct the irradiation range of the irradiation light in the vertical direction and in the road width direction before the main measurement.

(7) In the division line recognition apparatus (the exterior environment recognition apparatus 50) in the above (6), the setting unit 113 associates the irradiation position of the LiDAR 5 with the position of each lattice point obtained by dividing the first area (corresponding to the detection area BX1) in the road width direction based on an angular resolution as a first resolution.

With such a configuration, it becomes possible to appropriately reduce the number of irradiation points in the road width direction in the detection area BX1 to be irradiated with the irradiation light by the LiDAR 5.

(8) In the division line recognition apparatus (the exterior environment recognition apparatus 50) in the above (7), the setting unit 113 associates the irradiation position of the LiDAR 5 with the position of each lattice point obtained by further dividing the first area (corresponding to the detection area BX1) in the vertical direction based on the angular resolution as the first resolution.

With such a configuration, it becomes possible to appropriately reduce the number of irradiation points in the vertical direction in the detection area BX1 to be irradiated with the irradiation light by the LiDAR 5.

(9) In the division line recognition apparatus (the exterior environment recognition apparatus 50) in the above (8), the setting unit 113 associates the irradiation position of the LiDAR 5 with the position of each lattice point obtained by dividing the second and third areas (corresponding to the detection areas BY1 and BZ1) in the road width direction based on the angular resolution as a second resolution.

With such a configuration, it becomes possible to appropriately reduce the number of irradiation points in the road width direction in the detection areas BY1 and BZ1 to be irradiated with the irradiation light by the LiDAR 5.

(10) In the division line recognition apparatus (the exterior environment recognition apparatus 50) in the above (9), the setting unit 113 associates the irradiation position of the LiDAR 5 with the position of each lattice point obtained by further dividing the second and third areas (corresponding to the detection areas BY1 and BZ1) in the vertical direction based on the angular resolution as the second resolution.

With such a configuration, it becomes possible to appropriately reduce the number of irradiation points in the vertical direction in the detection areas BY1 and BZ1 to be irradiated with the irradiation light by the LiDAR 5.

The above embodiments can be modified in various modes. Hereinafter, modifications will be described.

(First Modification)

The mapping unit 114 may map, on a one-dimensional map, data indicating the height H of the road surface that has been detected, based on time-series point cloud data acquired by the LiDAR 5 at different positions on the road RD to generate continuous road surface gradient data.

More specifically, the mapping unit 114 calculates through the coordinate conversion of the relative position of the location point of the depth distance L1 on the road RD at each measurement time with the position of the subject vehicle 101 as the center, from the moving speed and the moving direction (for example, the azimuth angle) of the subject vehicle 101. The mapping unit 114 records, on the above one-dimensional map, the height H of the road surface at the location point of the depth distance L1 based on the point cloud data that has been acquired, whenever the point cloud data is acquired by the LiDAR 5 in the main measurement (step S310). The information of the one-dimensional map may be stored in the memory unit 12.

(Second Modification)

The reflection intensity of the irradiation light by the LiDAR 5 is weak on a road surface far away from the subject vehicle 101, and reflected light with sufficient intensity is not detectable in some cases. Such a depth distance of a case where the reflection intensity on the road surface decreases to a barely detectable level will be referred to as a maximum road surface detection distance L'.

In the second modification, in a case where the depth distance L to the detection area BX that is calculated from the vehicle speed of the subject vehicle 101 exceeds the maximum road surface detection distance L' (for example, in a case where the depth distance is L=150 m, whereas the maximum road surface detection distance L'=110 m), the height at the location point of the predetermined depth distance L is estimated from the height and the road gradient at the location point of the maximum road surface detection distance L' that has been acquired (calculated), based on the information that has been detected by the LiDAR 5, and the detection area BX at that time is set, based on the estimated height. In addition, a detection area BX' at the location point of the maximum road surface detection distance L' is also set simultaneously.

Note that the depth width of the detection area BX' is expanded, so that the detection area BX' and the detection area BX may be integrated as a continuous detection area.

According to the second modification, even in a situation in which it is difficult to detect the road surface itself resulting from being far away, it becomes possible to detect unevenness of the road surface, three-dimensional objects, and the like, which have a level of reflected light higher than that of the reflected light on the road surface.

The above embodiment can be combined as desired with one or more of the above modifications. The modifications can also be combined with one another.

According to the present invention, the division line can be recognized with accuracy, while the processing load is being reduced.

Above, while the present invention has been described with reference to the preferred embodiments thereof, it will be understood, by those skilled in the art, that various changes and modifications may be made thereto without departing from the scope of the appended claims.

What is claimed is:

1. A division line recognition apparatus comprising:
   a microprocessor and a memory coupled to the microprocessor;
   a LiDAR detection unit irradiating a surrounding of a subject vehicle with an electromagnetic wave to detect an exterior environment situation in the surrounding, wherein
   the microprocessor is configured to perform:
   while the subject vehicle is traveling on the road, outputting an irradiation instruction to the LiDAR detection unit to cause the electromagnetic wave to be irradiated and acquiring information detected by the LiDAR detection unit in response to the irradiation instruction;
   recognizing information indicating a division line in a first area separated from the subject vehicle on a road by a predetermined distance based on the information detected by the LiDAR detection unit at different positions on the road; and
   mapping the information indicating the division line based on a traveling direction and a driving speed of the subject vehicle, wherein
   the microprocessor is further configured to perform defining, as the first area, a band-shaped area which intersects the road, is located on the road at the predetermined distance from the subject vehicle, has a depth width, and extends in a road width direction, and,
   the microprocessor is configured to perform the defining including calculating the predetermined distance and the depth width based on a vehicle speed of the subject vehicle.

2. The division line recognition apparatus according to claim 1, wherein
   the microprocessor is configured to perform
   the recognizing including further recognizing information indicating a predetermined detection target in a second area on the road closer to the subject vehicle than the first area and a third area on the road farther from the subject vehicle than the first area, respectively at different positions on the road.

3. The division line recognition apparatus according to claim 2, wherein
   the microprocessor is configured to further perform
   outputting the irradiation instruction to the LiDAR detection unit including causing a number of irradiation points in the first area to correspond to a first angular resolution, and causing numbers of irradiation points in each of the second and third areas to correspond to a second angular resolution lower than the first angular resolution.

4. The division line recognition apparatus according to claim 1, wherein
   the microprocessor is configured to further perform
   setting an irradiation direction of the electromagnetic wave by outputting the irradiation instruction to the LiDAR detection unit so that at least the electromagnetic wave scattered on a road surface of the first area is detected.

5. The division line recognition apparatus according to claim 4, wherein
   the microprocessor is configured to perform
   the recognizing including further recognizing road surface data in the traveling direction of the subject vehicle based on information detected in a preliminary measurement before a main measurement of the LiDAR detection unit, and
   the setting including setting an irradiation range in a vertical direction and in the road width direction for irradiating the first area on the road with the electromagnetic wave, based on the predetermined distance and the road surface data.

6. The division line recognition apparatus according to claim 3, wherein
   the microprocessor is configured to perform
   the setting includes outputting the irradiation instruction so that an irradiation position of the LiDAR detection unit is associated with a position of each lattice point obtained by dividing the first area in a road width direction based on the first angular resolution.

7. The division line recognition apparatus according to claim 6, wherein
   the microprocessor is configured to perform
   the setting including outputting the irradiation instruction so that the irradiation position of the LiDAR detection unit is associated with a position of each lattice point obtained by further dividing the first area in a vertical direction based on the first angular resolution.

8. The division line recognition apparatus according to claim 7, wherein
the microprocessor is configured to perform
the setting including outputting the irradiation instruction so that the irradiation position of the LiDAR detection unit is associated with a position of each lattice point obtained by dividing the second and third areas in the road width direction based on the second angular resolution.

9. The division line recognition apparatus according to claim 8, wherein
the microprocessor is configured to perform
the setting including outputting the irradiation instruction so that the irradiation position of the LiDAR detection unit is associated with a position of each lattice point obtained by further dividing the second and third areas in the vertical direction based on the second angular resolution.

10. The division line recognition apparatus according to claim 1, wherein
the microprocessor is configured to perform
the recognizing including calculating a difference of height with a first part whose luminance exceeds a predetermined luminance and a second part whose luminance is less than or equal to the predetermined luminance in a road surface of the first area, when an absolute value of the difference is a determination threshold, detecting the first part as the division line, and recognizing a detection position of the division line as the information indicating the division line.

11. The division line recognition apparatus according to claim 1, wherein
the microprocessor is configured to further perform
outputting the irradiation instruction to the LiDAR detection unit at a predetermined cycle while the subject vehicle is traveling on the road, and
recognizing the information indicating the division line in the first area, based on each information detected by the LiDAR detection unit according to the irradiation instruction.

12. The division line recognition apparatus according to claim 1 further comprising
a traveling actuator for controlling a traveling of the subject vehicle, and
the microprocessor is configured to further perform
generating a target path based on the information indicating the division line, and controlling the traveling actuator to cause the subject vehicle to travel along the target path.

13. The division line recognition apparatus according to claim 11, wherein
the microprocessor is further configured to perform,
the defining including calculating the predetermined distance and the depth width based on the vehicle speed of the subject vehicle such that point cloud data detected by the LiDAR detection unit in response to the irradiation instruction previously output and point cloud data acquired by the LiDAR detection unit in response to the irradiation instruction currently output are connected with each other so as not to generate a blank section in the traveling direction.

* * * * *